US008149136B2

(12) United States Patent
Feroldi

(10) Patent No.: US 8,149,136 B2
(45) Date of Patent: Apr. 3, 2012

(54) REMOTELY CONFIGURABLE VEHICULAR SIGN

(75) Inventor: John R. Feroldi, Oakton, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 379 days.

(21) Appl. No.: 12/327,916

(22) Filed: Dec. 4, 2008

(65) Prior Publication Data

US 2010/0141418 A1    Jun. 10, 2010

(51) Int. Cl.
*G08G 1/00* (2006.01)
(52) U.S. Cl. ........ 340/901; 340/468; 340/463; 340/464; 340/471; 340/472

(58) Field of Classification Search ................ 340/468, 340/463, 464, 469, 471, 472
See application file for complete search history.

(56) References Cited

U.S. PATENT DOCUMENTS

| 6,300,870 | B1 * | 10/2001 | Nelson | 340/468 |
| 2008/0183586 | A1 * | 7/2008 | Smith | 705/14 |

\* cited by examiner

*Primary Examiner* — Daryl Pope

(57) ABSTRACT

A configurable sign includes a mounting mechanism that connects the configurable sign to a vehicle, a display, a memory to store a plurality of instructions, and a processor to execute instructions in the memory. The processor executes instructions in the memory to receive configured sign information from one of a user device or a server, configure one of text, graphics, video, or audio, associated with the display, based on the configured sign information, and display, via the display, the configured text, graphics, video, or audio.

22 Claims, 17 Drawing Sheets

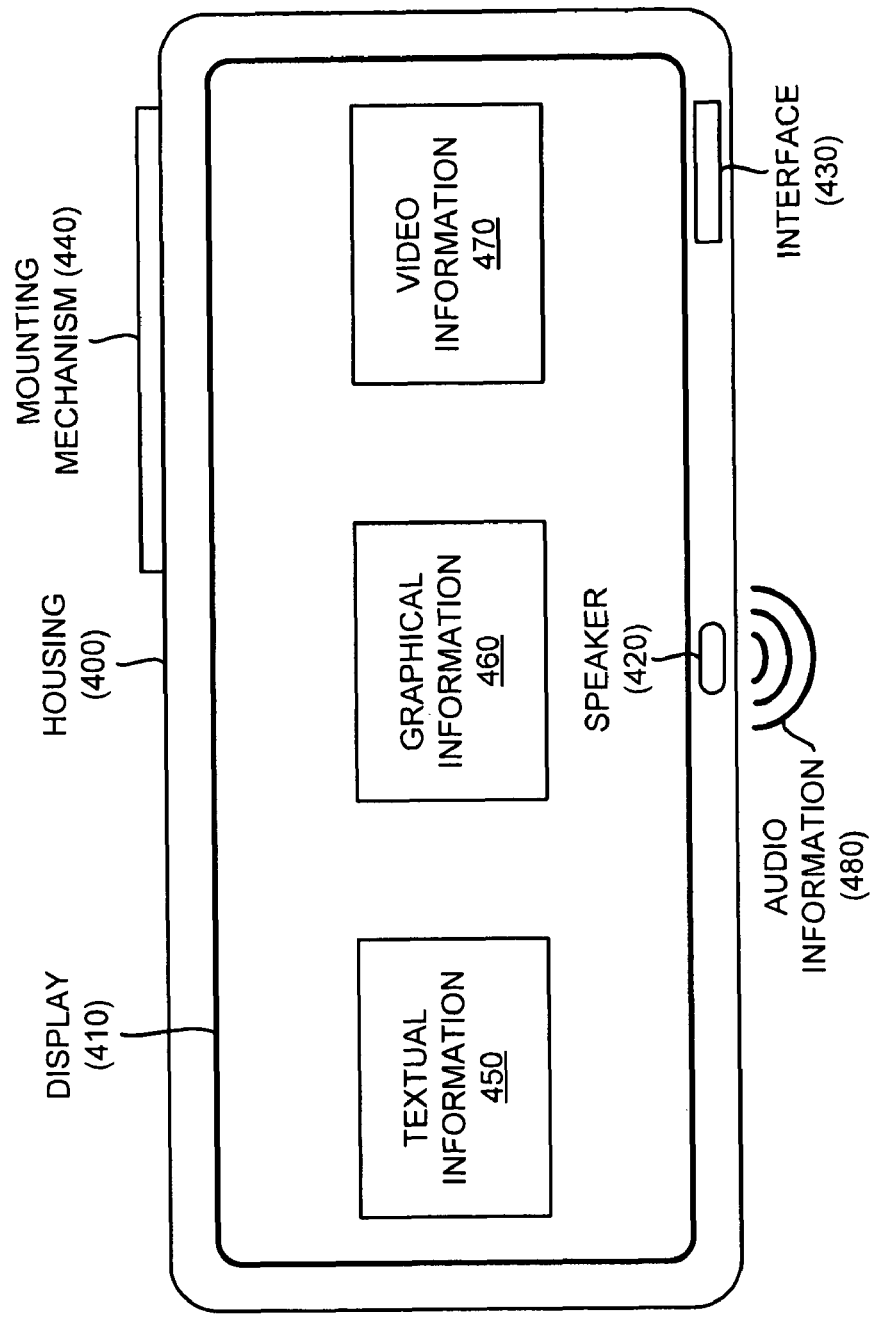

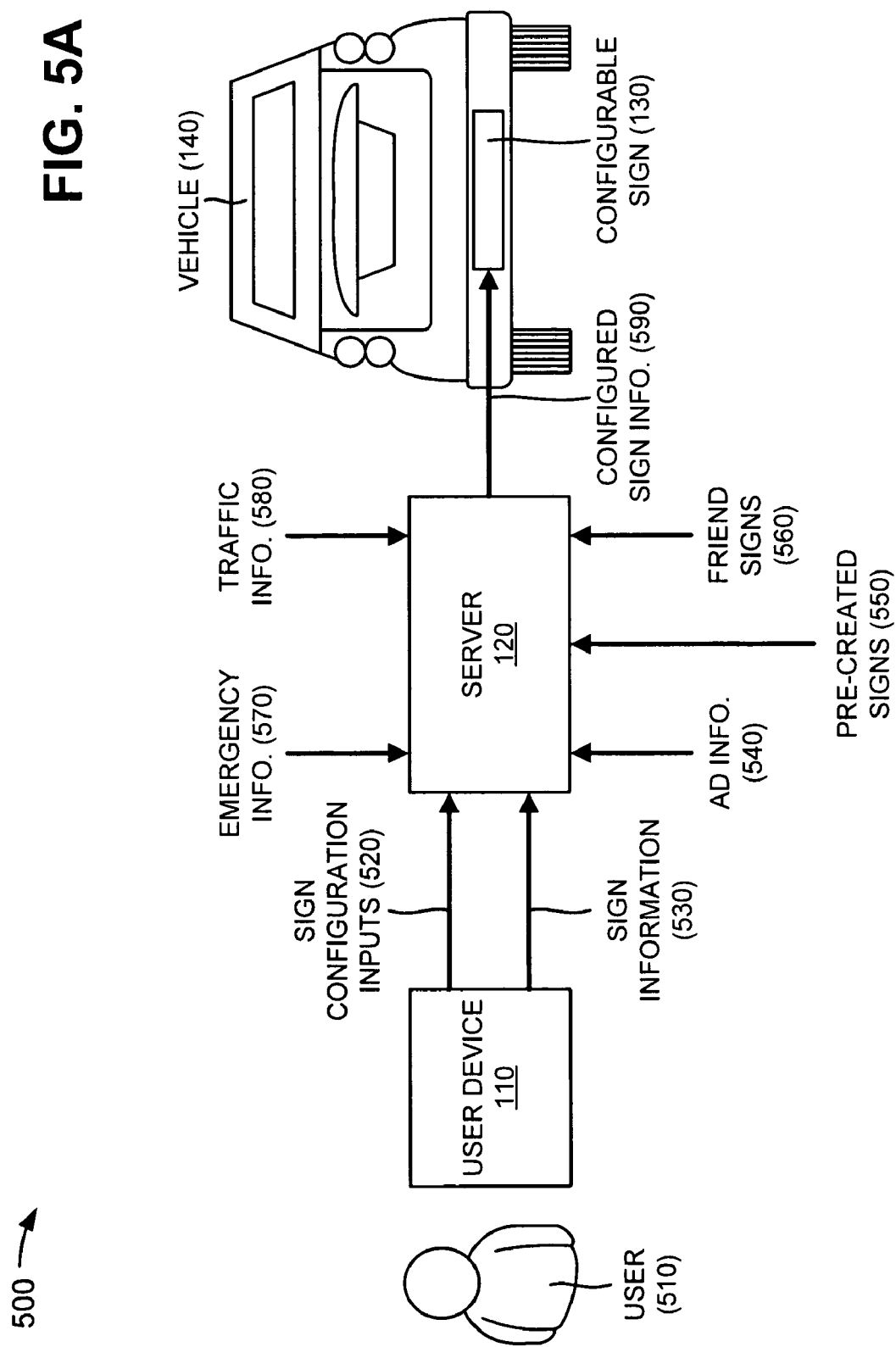

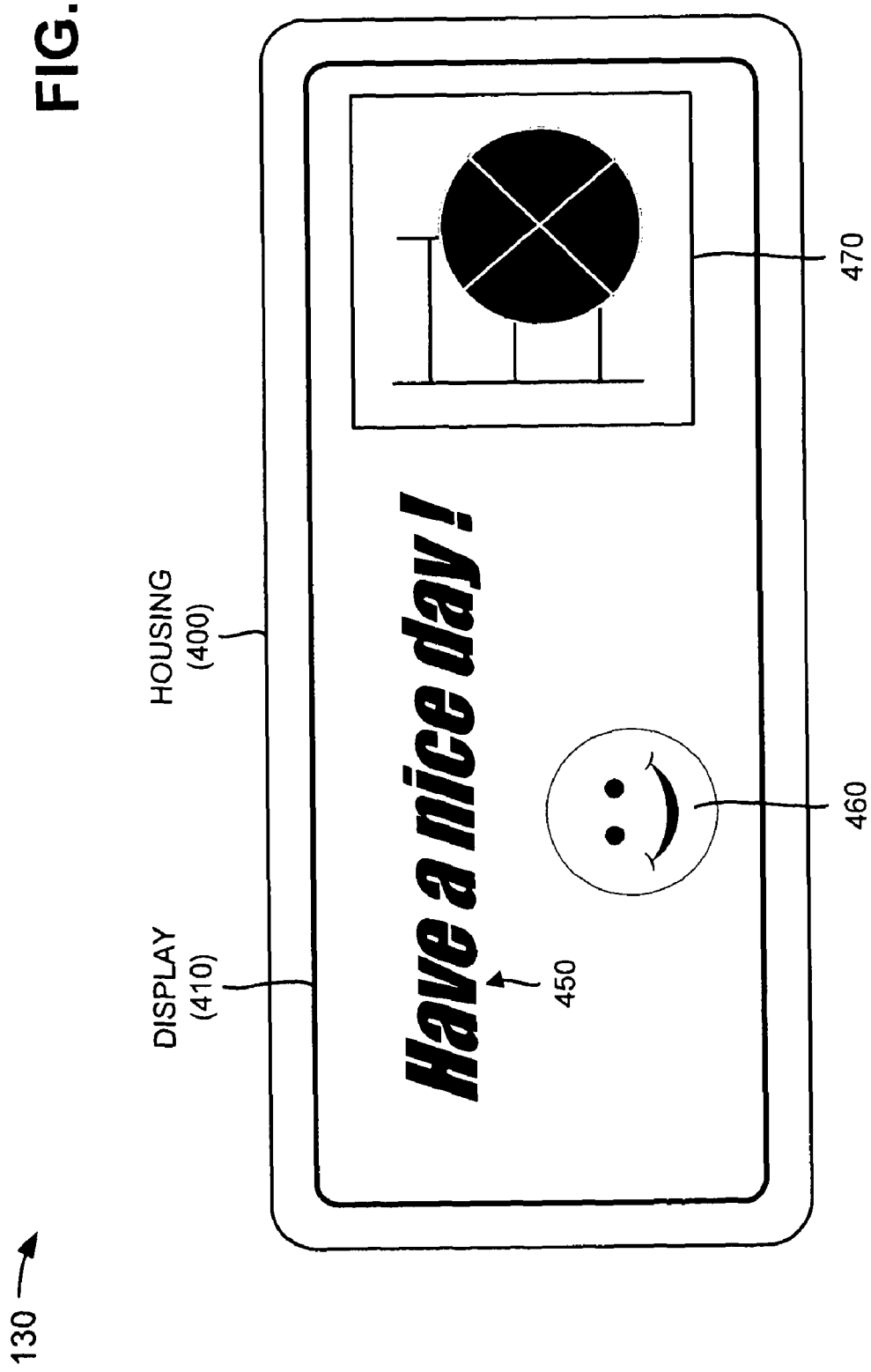

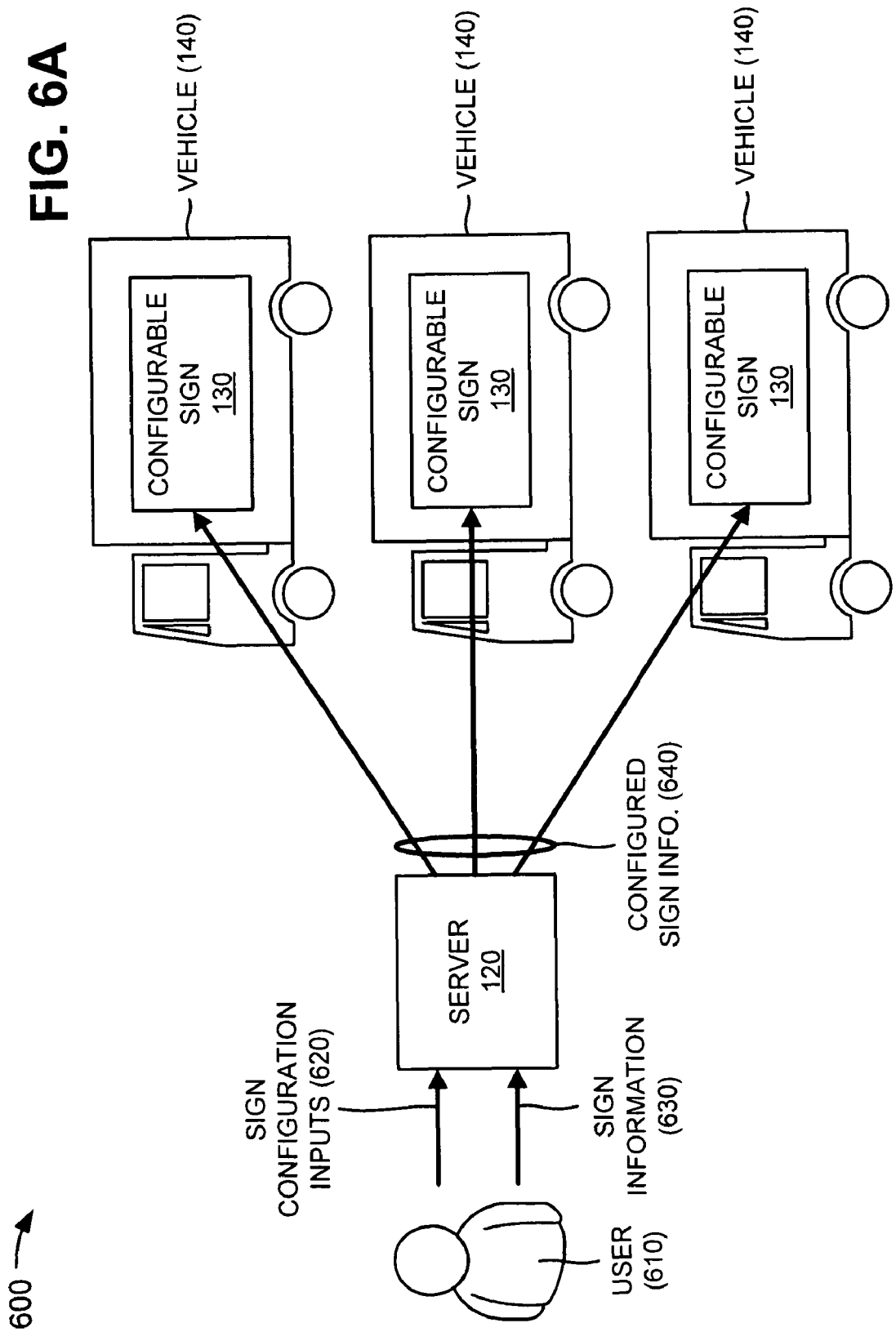

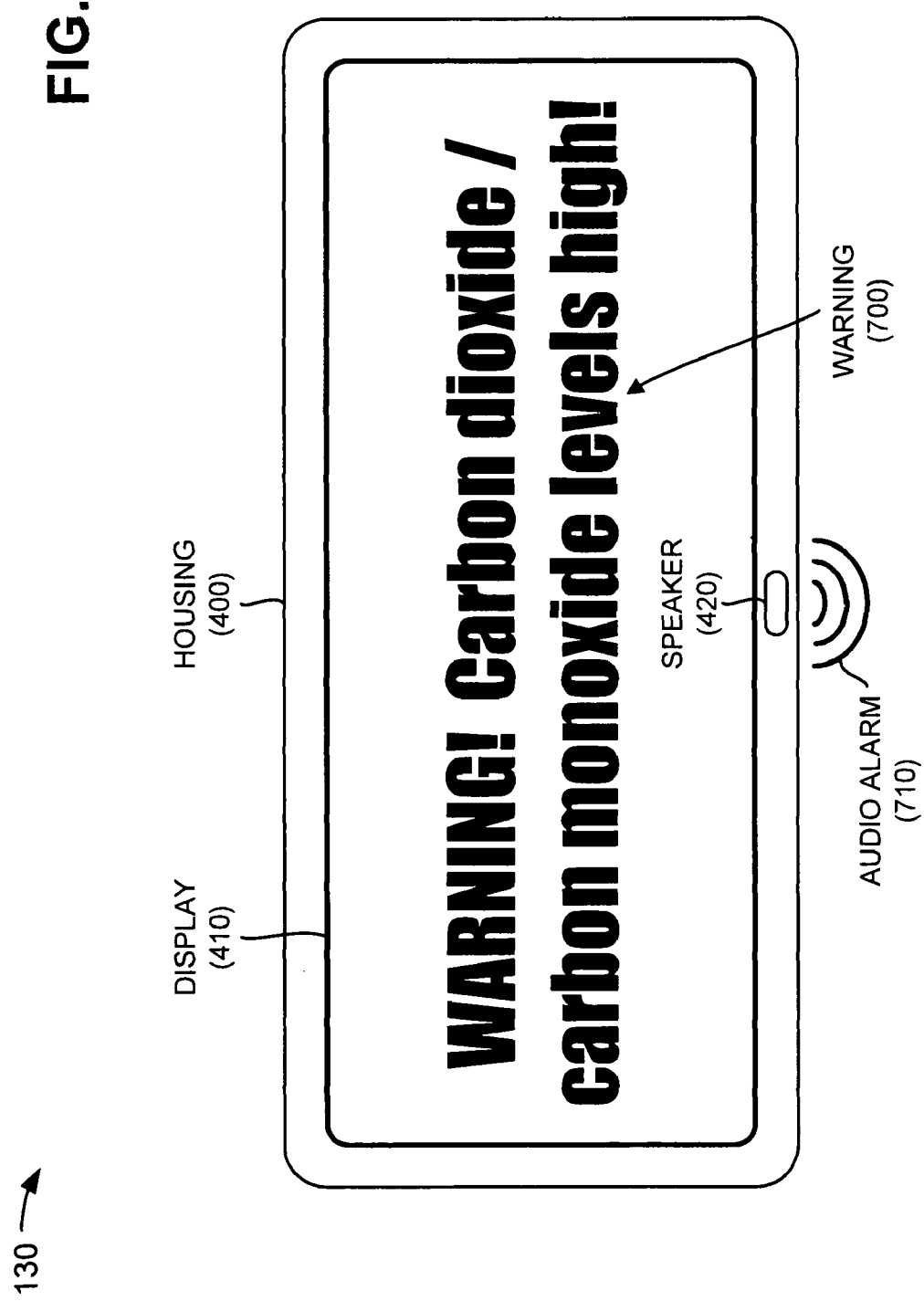

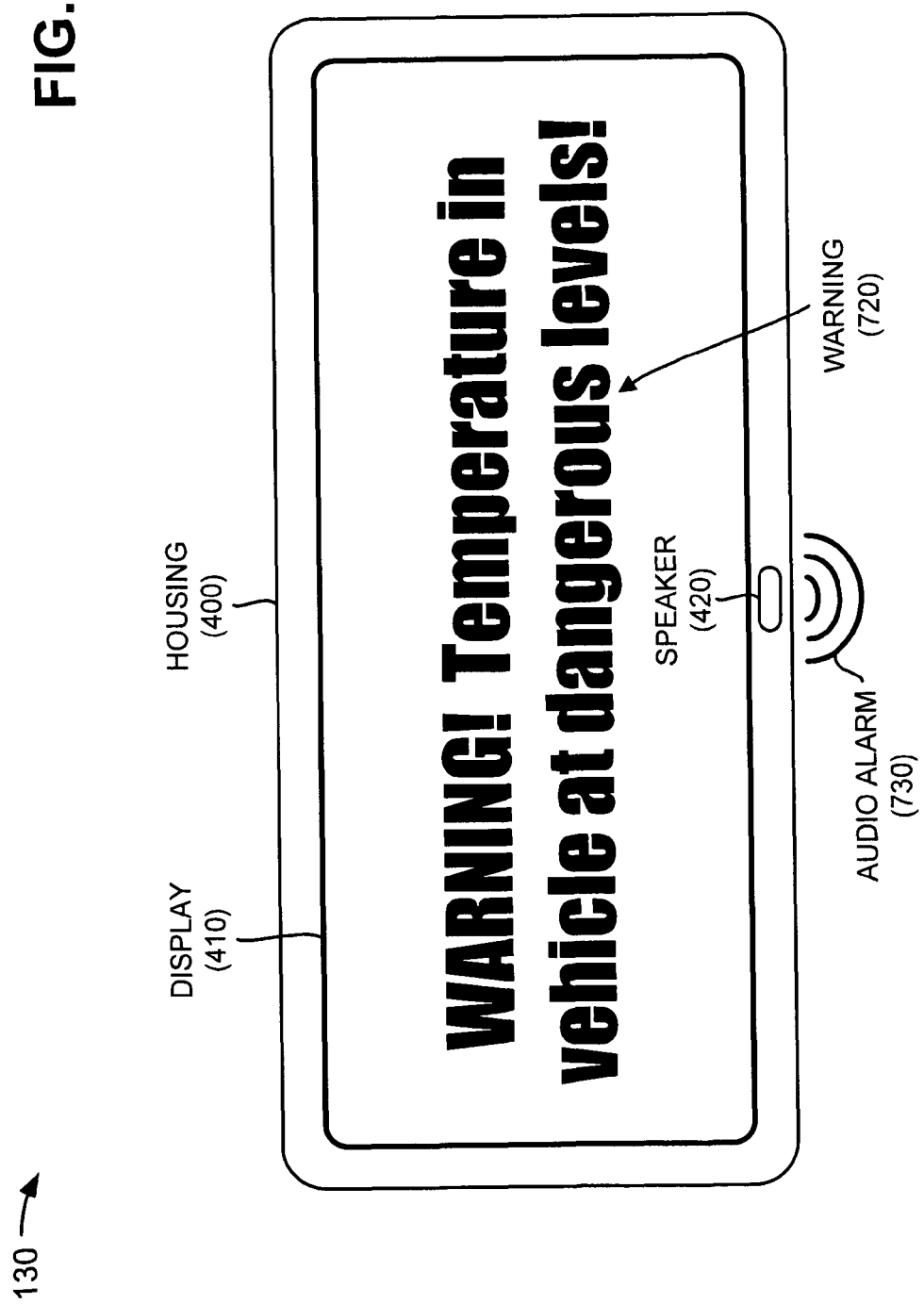

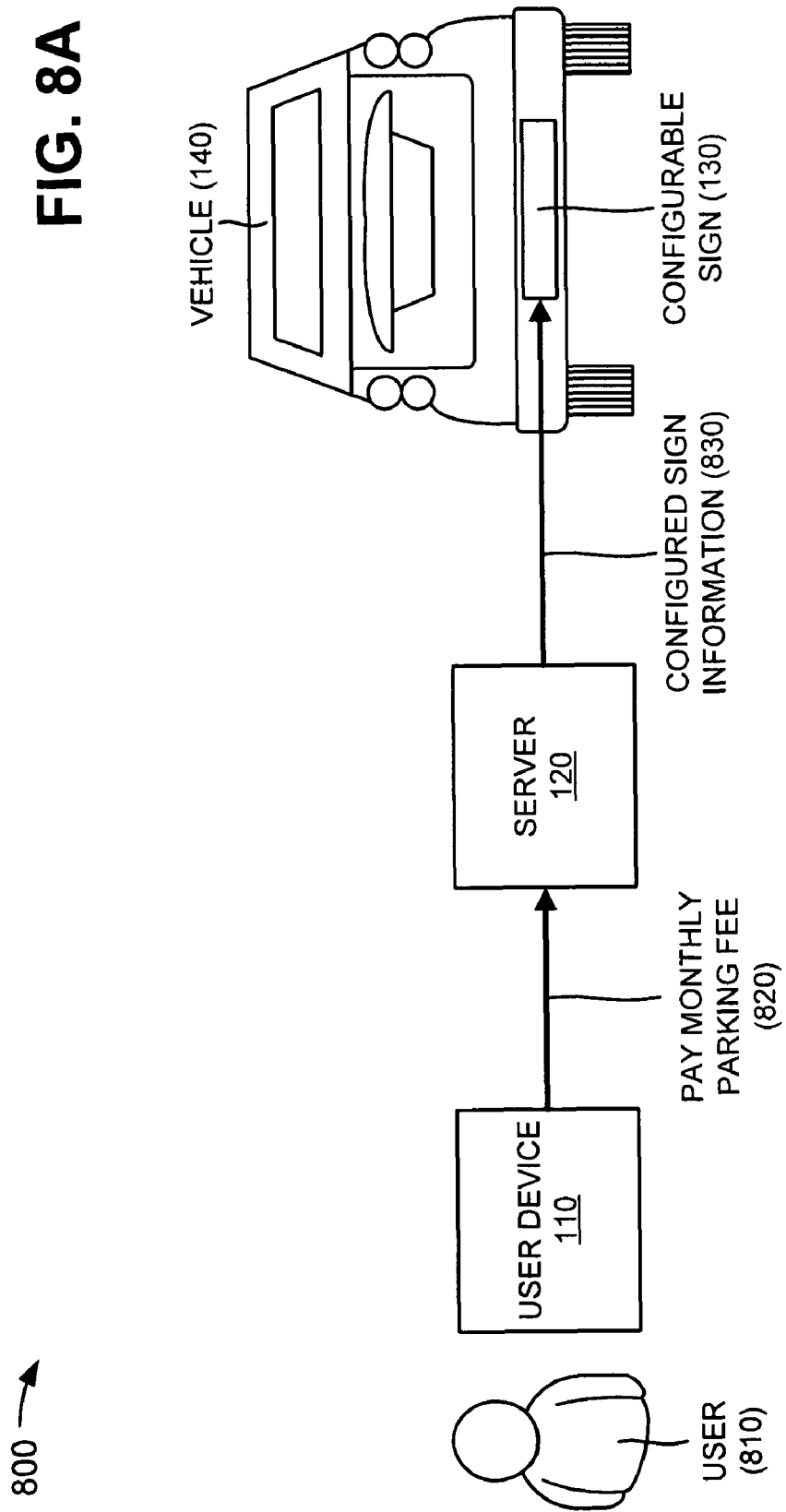

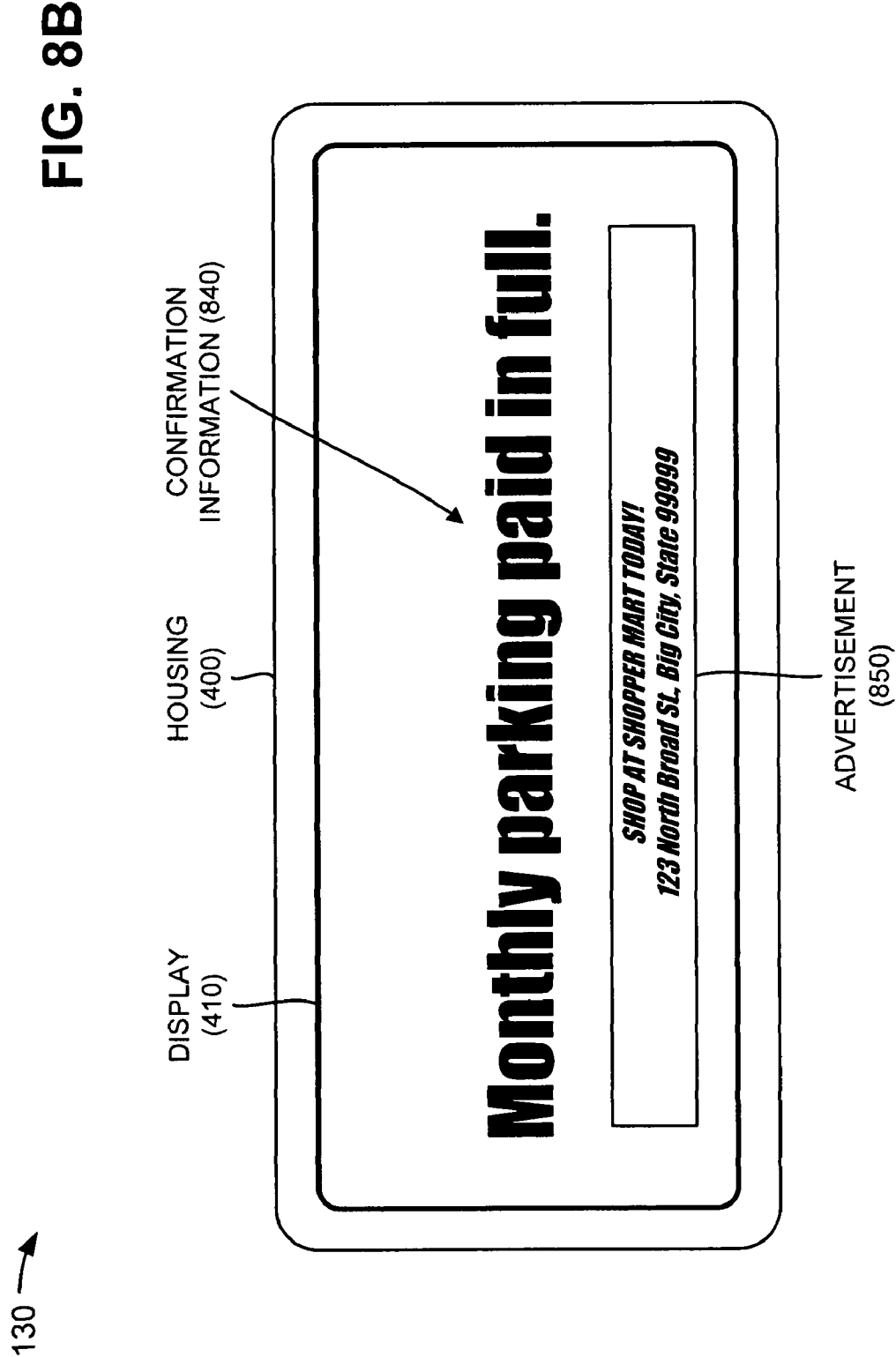

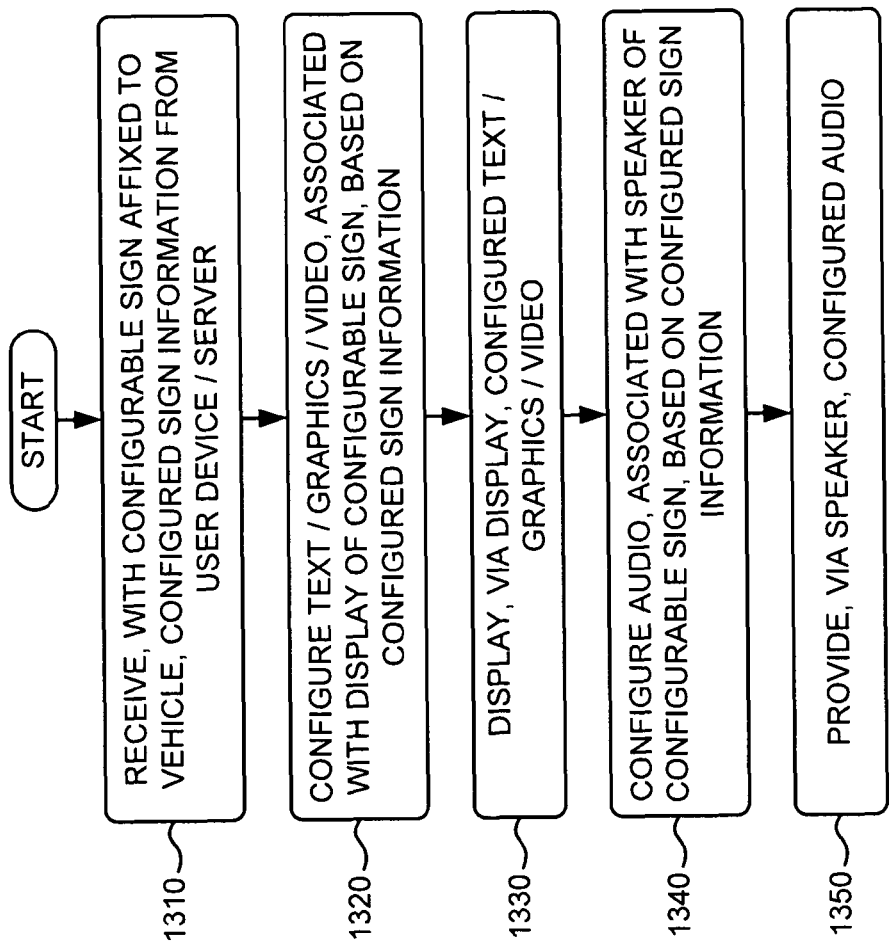

REMOTELY CONFIGURABLE VEHICULAR SIGN

BACKGROUND

A bumper sticker is an adhesive label or sticker with a message. A bumper sticker is intended to be attached to a bumper of a vehicle and to be read by the occupants of other vehicles, although they are often attached to other objects. Bumper stickers may be entertaining or humorous, may provide support for a sports team or other organization, may promote or oppose a particular philosophical or political position, etc. However, bumper stickers contain a fixed message and are not configurable. Some vehicle license plate frames (e.g., frames for retaining license plates) may provide digital (e.g., light-emitting diode (LED)-based) scrolling text that may include personalized messages. However, such license plate frames only provide limited personalized scrolling text messages.

BRIEF DESCRIPTION OF THE DRAWINGS

FIG. 4 illustrates a diagram of exemplary components of the configurable vehicular sign of the network depicted in FIG. 1;

FIG. 5A depicts a diagram of exemplary sign configuration operations capable of being performed by an exemplary portion of the network illustrated in FIG. 1;

FIG. 5B illustrates a diagram of an exemplary configurable vehicular sign capable of being produced by the operations depicted in FIG. 5A;

FIG. 6A depicts a diagram of exemplary sign configuration operations capable of being performed by an exemplary portion of the network illustrated in FIG. 1;

FIGS. 7A and 7B depict diagrams of exemplary configurable vehicular signs showing emergency information;

FIG. 8A illustrates a diagram of exemplary sign configuration operations capable of being performed by an exemplary portion of the network depicted in FIG. 1;

FIG. 8B depicts a diagram of an exemplary configurable vehicular sign capable of being produced by the operations depicted in FIG. 8A;

FIG. 13 illustrates a flow chart of an exemplary process for configuring and displaying information via a configurable vehicular sign according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may remotely configure a sign affixed to a vehicle in order to customize the sign to a particular user, application, event, etc. In one implementation, for example, the systems and/or methods may receive sign configuration information from a user device, and may receive, from other sources, additional information associated with a configurable sign. The systems and/or methods may create configured sign information based on the received information, and may provide the configured sign information to the configurable sign affixed to a vehicle, where the configurable sign may display the configured sign information.

As used herein, the term "user" is intended to be broadly interpreted to include a user device or a user of a user device. A "product," as the term is used herein, is to be broadly interpreted to include any thing that may be marketed or sold as a commodity or a good. For example, a product may include gas, bread, coffee, bottled water, milk, soft drinks, pet food, beer, diesel fuel, meat, fruit, etc. A "service," as the term is used herein, is to be broadly interpreted to include any act or variety of work done for others (e.g., for compensation). For example, a service may include a repair service (e.g., for a product), a warranty (e.g., for a product), telecommunication services (e.g., telephone services, Internet services, network services, radio services, television services, video services, etc.), etc.

Figure 1:
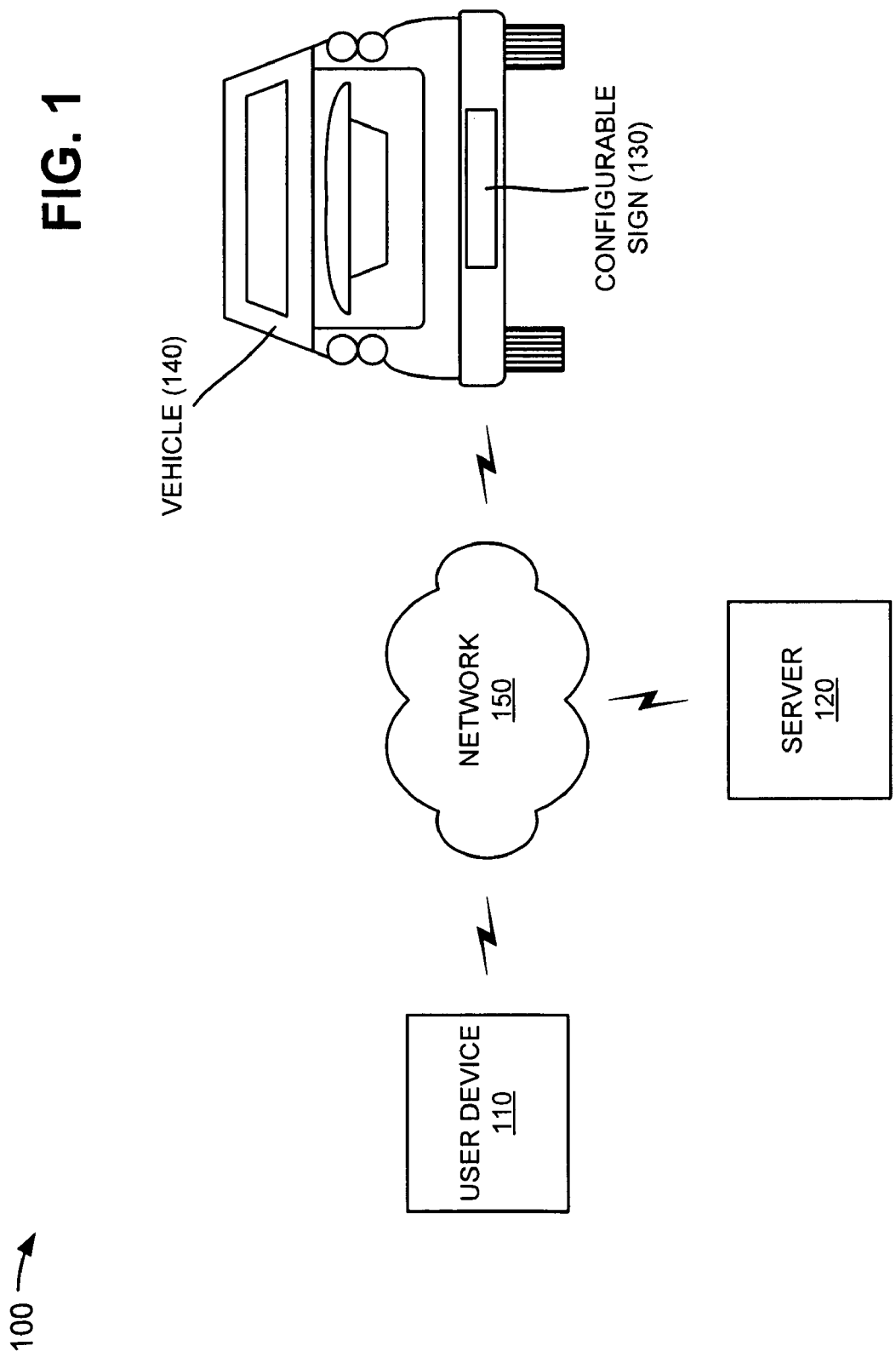
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a user device 110, a server 120, and/or a configurable sign 130 (e.g., affixed to a vehicle 140) interconnected by a network 150. Components of network 100 may interconnect via wired and/or wireless connections. A single user device 110, server 120, configurable sign 130, vehicle 140, and network 150 have been illustrated in FIG. 1 for simplicity. In practice, there may be more user devices 110, servers 120, configurable signs 130, vehicles 140, and/or networks 150. Also, in some instances, one or more of the components of network 100 may perform one or more functions described as being performed by another one or more of the components of network 100.

User device 110 may include any device that is capable of accessing server 120 and/or configurable sign 130 via network 150. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, or other types of computation or communication devices, threads or processes running on these devices, and/or objects executable by these devices. In one implementation, user device 110 may enable a user to configure information displayed by configurable sign 130, in a manner described herein. For example, user device 110 may create a sign to be displayed by configurable sign 130 (e.g., either directly via user device 110 or via interaction with server 120), may select a sign to be displayed by configurable sign 130 (e.g., via interaction with server 120), and may provide the created and/or selected sign to configurable sign 130. Configurable sign 130 may receive the created/selected sign from user device 110 (or from server 120), and may display the created/selected sign.

Server 120 may include one or more server entities, or other types of computation or communication devices, that gather, process, search, and/or provide information in a manner described herein. Server 120 may receive sign information and/or sign configuration inputs for configurable sign 130 from user device 110, and may receive advertisement information for configurable sign 130 (e.g., from one or more providers of a product and/or service). Server 120 may receive pre-created signs (e.g., that may be displayed by configurable sign 130) from a producer of signs (e.g., similar to a producer of bumper stickers), and may receive signs created by friends of the user associated with configurable sign 130. Server 120 may also receive emergency information (e.g., evacuation information, warnings associated with operation of vehicle 140 and/or vehicle passengers, etc.) from state or federal agencies (e.g., in the event of a state or national emergency) or from a manufacturer of vehicle 140. Server 120 may store such information in a repository (or database) associated with server 120, and may utilize such information to create configured sign information that may be displayed by configurable sign 130.

In another implementation, if server 120 is associated with a product and/or service provider, server 120 may receive (e.g., from a user) sign configuration inputs and/or sign information for multiple configurable signs 130 affixed to multiple vehicles 140. For example, the user may provide sign configuration inputs for a current promotion being offered by the product and/or service provider. Server 120 may create configured sign information (e.g., information for displaying a sign providing the current promotion offered by the product and/or service provider), and may provide the configured sign information to the multiple configurable signs 130 affixed to multiple vehicles 140. Such an arrangement may enable the product and/or service provider to display the same promotion on vehicles 140 owned (or associated with) the provider. Server 120 may also customize the configured sign information based on geography, time, etc. In such a scenario, server 120 may provide certain customized sign information to certain configurable signs 130 (e.g., configurable signs 130 affixed to vehicles 140 in a certain geographical area and/or at a certain time of day), and may provide other customized sign information to other configurable signs 130 (e.g., configurable signs 130 affixed to vehicles 140 in another geographical area and/or at another time of day).

In still other implementations, user device 110 and/or server 120 may create sign information (e.g., for display by configurable sign 130) that includes advertisements (e.g., satellite radio subscribers may be paid to display advertisements on configurable sign 130), event or location information (e.g., groups traveling in multiple vehicles to events may provide, via configurable sign 130, event information or global positioning system (GPS) information), authorization information (e.g., configurable sign 130 may display a parking fee payment, a high-occupancy vehicle (HOV) permit, etc.), other information (e.g., a current radio station and/or song being played by a radio associated with vehicle 140), etc.

Configurable sign 130 may include a device that may be affixed to vehicle 140 (e.g., to an interior portion or an exterior portion of vehicle 140) and may include an electronic and/or electro-mechanical display that may display information (e.g., textual information, graphical information, video information, audio information, etc.). In one implementation, configurable sign 130 may be remotely configured via user device 110 and/or server 120. Further details of configurable sign 130 are provided below in connection with, for example, FIGS. 2 and 4-8B.

Vehicle 140 may include a mechanism for transporting people or things. For example, vehicle 140 may include an automobile, a van, a truck, a motorcycle, a bicycle, etc.

Network 150 may include a local area network (LAN), a wide area network (WAN), a metropolitan area network (MAN), a telephone network, such as the Public Switched Telephone Network (PSTN), the Public Land Mobile Network (PLMN), or a cellular telephone network, an intranet, the Internet, or a combination of networks.

Figure 2:
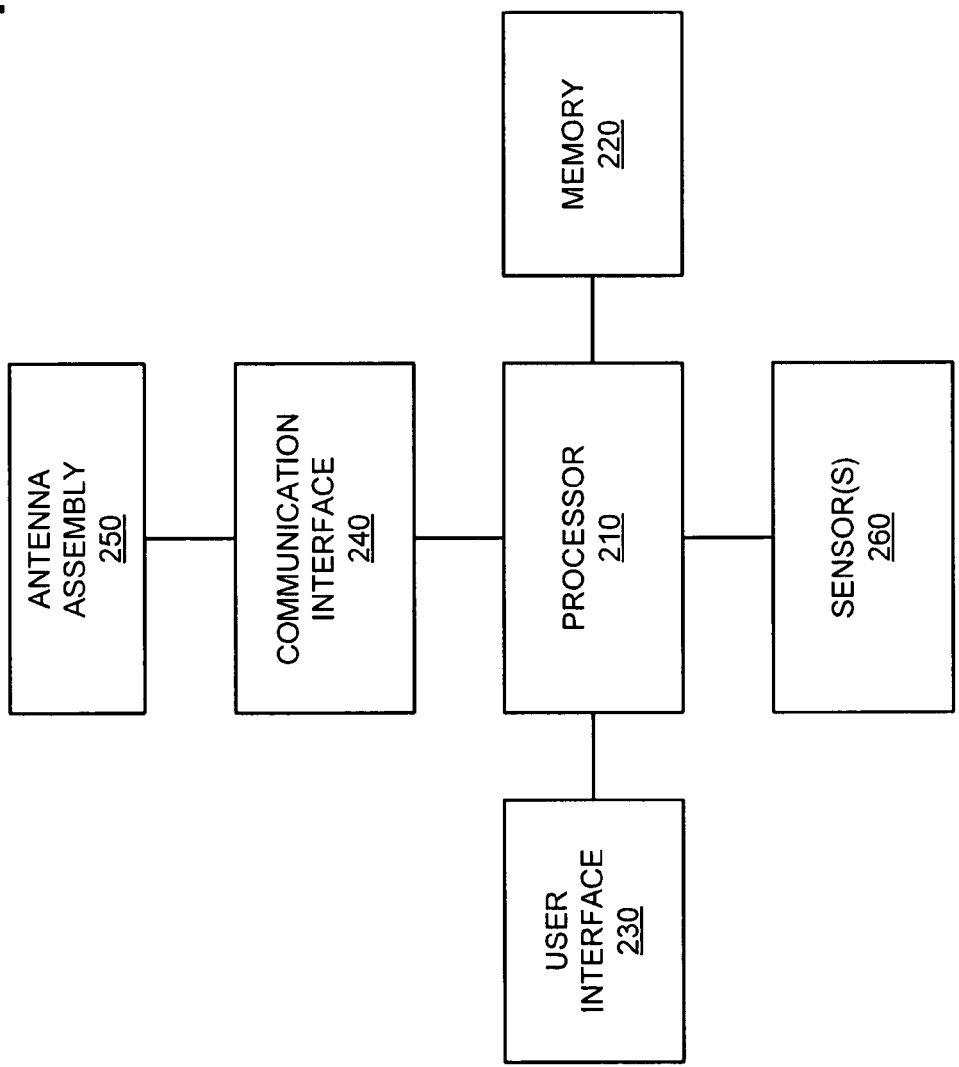
FIG. 2 illustrates a diagram of exemplary components of a user device and/or a configurable vehicular sign of the network depicted in FIG. 1.

FIG. 2 illustrates a diagram of exemplary components of a device 200 that may correspond to user device 110 and/or configurable sign 130. As illustrated, device 200 may include a processor 210, memory 220, a user interface 230, a communication interface 240, an antenna assembly 250, and/or one or more sensors 260.

Processor 210 may include one or more microprocessors, application-specific integrated circuits (ASICs), field-programmable gate arrays (FPGAs), or the like. Processor 210 may control operation of device 200 and its components. In one implementation, processor 210 may control operation of components of device 200 in a manner described herein.

Memory 220 may include a random access memory (RAM), a read-only memory (ROM), and/or another type of memory to store data and instructions that may be used by processor 210.

User interface 230 may include mechanisms for inputting information to device 200 and/or for outputting information from device 200. Examples of input and output mechanisms might include buttons (e.g., control buttons, keys of a keypad or keyboard, a joystick, etc.) or a touch screen interface (e.g., a display) to permit data and control commands to be input into device 200; a speaker to receive electrical signals and output audio signals; a microphone to receive audio signals and output electrical signals; a display to output visual information (e.g., text input into device 200); a vibrator to cause device 200 to vibrate; etc.

Communication interface 240 may include, for example, a transmitter that may convert baseband signals from processor 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 250 may, for example, receive RF signals from communication interface 240 and transmit them over the air, and receive RF signals over the air and provide them to communication interface 240. In one implementation, for example, communication interface 240 may communicate with a network and/or devices connected to a network.

In implementations where device 200 corresponds to configurable sign 130, device may further include sensor(s) 260. Sensor(s) 260 may include mechanisms for sensing or detecting environmental conditions associated with configurable sign 130 and/or vehicle 140. For example, if configurable sign 130 is provided in an interior portion of vehicle 140, sensor(s) 260 may include a thermometer (e.g., for sensing an interior temperature of vehicle 140), a carbon dioxide detector (e.g., for sensing carbon dioxide levels within vehicle 140), a carbon monoxide detector (e.g., for sensing carbon monoxide levels within vehicle 140), etc.

As will be described in detail below, device 200 may perform certain operations described herein in response to processor 210 executing software instructions of an application contained in a computer-readable medium, such as memory 220. A computer-readable medium may be defined as a physical or logical memory device. A logical memory device may include memory space within a single physical memory device or spread across physical memory devices. The software instructions may be read into memory 220 from another computer-readable medium or from another device via communication interface 240. The software instructions contained in memory 220 may cause processor 210 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
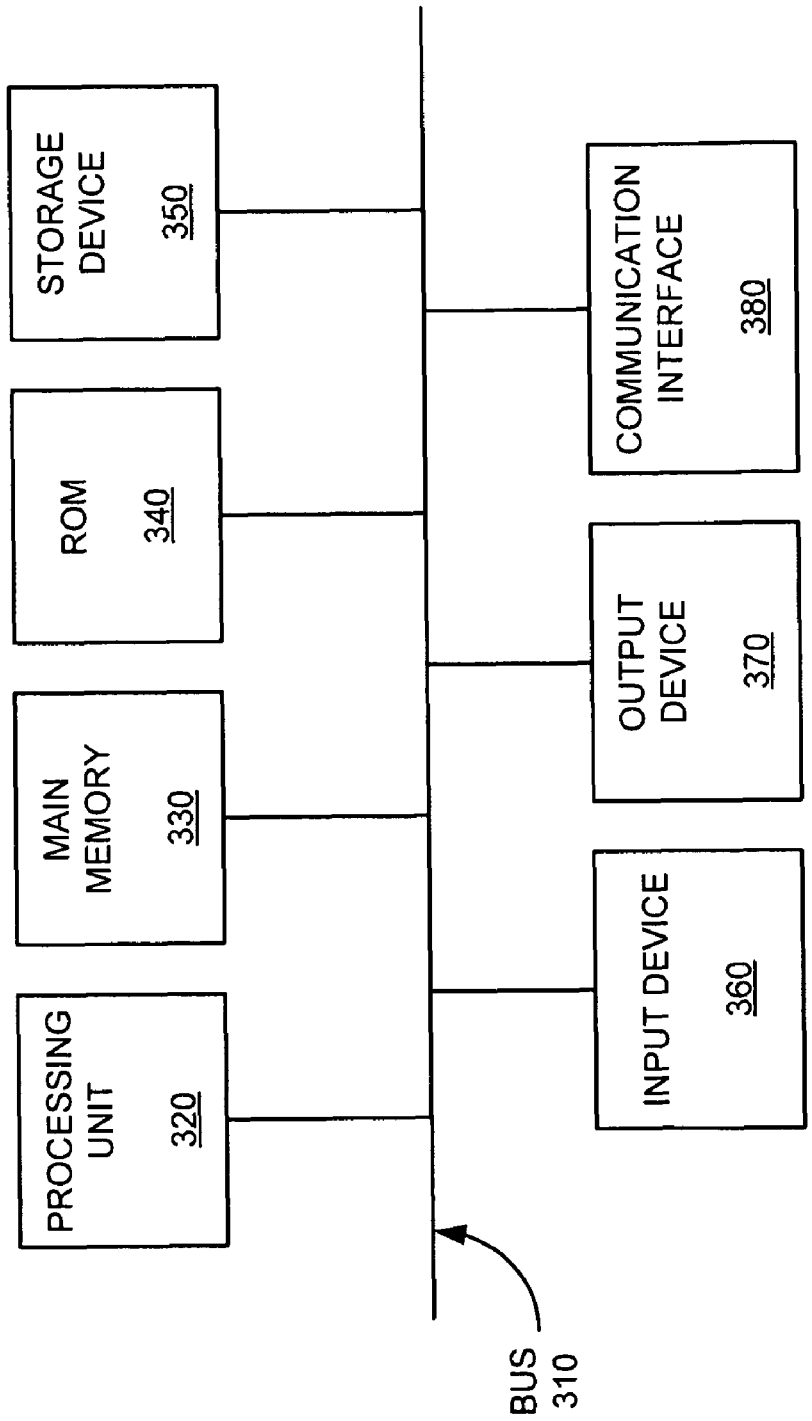
FIG. 3 depicts a diagram of exemplary components of a server of the network illustrated in FIG. 1.

FIG. 3 is an exemplary diagram of a device 300 that may correspond to server 120. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, a remote control, a touch screen, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 150.

As described herein, device 300 may perform certain operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

FIG. 4 illustrates a diagram of exemplary components of configurable sign 130. As shown, configurable sign 130 may include a housing 400, a display 410, a speaker 420, an interface 430, and/or a mounting mechanism 440.

Housing 400 may protect the components of configurable sign 130 from outside elements. Housing 400 may include a structure configured to hold devices and components used in configurable sign 130, and may be formed from a variety of materials. For example, housing 400 may be formed from plastic, metal, or a composite, and may be configured to support display 410, speaker 420, and/or interface 430.

Display 410 may include an electronic or electro-mechanical (e.g., that includes one or more movable mechanical elements or pixels) display that provides visual information. For example, display 410 may include a liquid crystal display (LCD), such as a thin film transistor (TFT) LCD, etc. In one exemplary implementation, display 410 may include a plastic substrate that arranges TFTs on a metal foil or glass, and may include a color filter coated onto the plastic substrate, which may permit display 410 to display color images. In other implementations, display 410 may include a monochrome LCD. In another implementation, display 410 may be based on e-paper technology, which is a display technology that mimics that appearance of ordinary ink on paper. Unlike an LCD display, which may use a backlight to illuminate its visual area, e-paper may reflect light like ordinary paper and may be capable of holding text and images indefinitely without drawing electricity, while allowing the image to be changed later.

In one exemplary implementation, display 410 may include a transmissive, reflective, or transflective display. A transmissive display may be illuminated from the back by an illumination device/light source (e.g., a backlight), and may be viewed from the opposite side (i.e., the front). A reflective display (e.g., often found in digital watches or calculators) may be illuminated by external light reflected by a diffusing reflector located behind the display. A transflective display may function as either a transmissive display or a reflective display, depending on an amount of ambient light.

As further shown in FIG. 4, display 410 may display textual information 450, graphical information 460, and/or video information 470 that may be fixed, repeating, scrolling, color, monochrome, inverse, etc. Textual information 450 may include multilingual characters, numbers, punctuation symbols, etc. Graphical information 460 may include pictures, symbols, photographs, drawings, graphs, diagrams, symbols, geometric designs, maps, other images, etc. Video information 470 may include videos provided in digital formats (e.g., Motion Picture Editors Guild (MPEG-4) format), analog formats, etc.

Speaker 420 may provide audio information 480. Audio information 480 may include audible information, such as audio associated with video information 470, warnings, alerts, alarms, etc. Speaker 420 may be located in any portion of configurable sign 130, may receive electrical signals (e.g., from processor 210), and may output audio signals based on the received electrical signals.

Interface 430 may include a Universal Serial Bus (USB) port, an Ethernet-based port, a serial port, a parallel port, a wireless interface (e.g., capable of receiving WiFi, Bluetooth, infrared, WiMax, etc. based signals), etc. Interface 430 may enable configurable sign 130 to receive information from a keyboard, a flash drive, user device 110, server 120, and/or other devices capable of providing information to configurable display 130. For example, in one implementation, interface 430 may directly connect to a keyboard and/or user device 110 (e.g., via a wired connection), and may receive information directly from the keyboard and/or user device 110. In other implementations, interface 430 may enable configurable sign 130 to be remotely configured (e.g., via user device 110 and/or server 120) without a direct wired connection to configurable sign 130. In still other implementations, interface 430 may connect configurable sign 130 to control and/or entertainment systems associated with vehicle 140. For example, interface 430 may connect configurable sign 130 to a motorist assistance system (e.g., OnStar, AAA, etc.) associated with vehicle 140, broadcast radio and/or television services received by vehicle 140, satellite radio services received by vehicle 140, a control system associated with vehicle 140, a GPS associated with vehicle 140, etc.

Mounting mechanism 440 may include a variety of mechanisms that may affix configurable sign 130 to vehicle 140. For example, mounting mechanism 440 may affix configurable sign 130 to an exterior portion (e.g., a bumper) or an interior portion (e.g., a window) associated with vehicle 140 (e.g., in compliance with applicable state and/or federal motor vehicle laws). An exterior mounting mechanism 440 may include mechanisms (e.g., a mounting plate, screws, nuts, bolts, adhesives, suction cups, other fasteners, etc.) that affix configurable sign 130 to an exterior portion of vehicle 140. The exterior mounting mechanism 440 may also include an anti-theft device that may disable configurable sign 130 if configurable sign 130 is illegally removed (e.g., stolen) from vehicle 140. An interior mounting mechanism 440 may include mechanisms (e.g., suction cups, other fasteners, etc.) that affix configurable sign 130 to an interior portion of vehicle 140.

Configurable sign 130 may include various other components not shown in FIG. 4. For example, configurable sign 130 may include a digital video recorder (DVR) capable of receiving and/or playing a compact disk (CD), a digital video disk (DVD), and/or other audio/visual media. In another example, if configurable sign 130 is provided in an interior portion of vehicle 140, configurable sign 130 may include sensors (e.g., sensor(s) 260), such as a thermometer (e.g., for sensing an interior temperature of vehicle 140), a carbon dioxide/monoxide detector (e.g., for sensing carbon dioxide/monoxide levels within vehicle 140), etc.

Configurable sign 130 may be powered by one or more batteries, a twelve-volt adapter (e.g., a cigarette lighter adapter) provided in vehicle 140, a control system associated with vehicle 140, one or more solar cells, etc. In one exemplary implementation, configurable sign 130 may include security features. For example, a password (or multiple levels of passwords) may be used to control access (e.g., by user device 110, server 120, etc.) to configurable sign 130, information provided to and/or stored by configurable sign 130 may be encrypted, and/or parental control technology may utilized by configurable sign 130 to prevent undesirable, illegal, or inappropriate content from being displayed by configurable sign 130. In another implementation, configurable sign 130 may include an emergency broadcast override feature that may advise travelers of an emergency (e.g., a hurricane) and may provide instructions (e.g., a hurricane evacuation route).

Although FIG. 4 shows exemplary components of configurable sign 130, in other implementations, configurable sign 130 may contain fewer, different, differently arranged, or additional components than depicted in FIG. 4. In still other implementations, one or more components of configurable sign 130 may perform one or more other tasks described as being performed by one or more other components of configurable sign 130.

FIG. 5A depicts a diagram of exemplary sign configuration operations capable of being performed by an exemplary portion 500 of network 100. As illustrated, exemplary network portion 500 may include user device 110, server 120, configurable sign 130, and vehicle 140. User device 110, server 120, configurable sign 130, and vehicle 140 may include the features described above in connection with, for example, FIGS. 1-4.

As further shown in FIG. 5A, a user 510 may be associated with user device 110. In one implementation, user 510 may include an owner of user device 110, configurable sign 130, and/or vehicle 140. In other implementations, user 510 may be associated with user device 110, configurable sign 130, and/or vehicle 140, but may not be the owner of user device 110, configurable sign 130, and/or vehicle 140. For example, user 510 may be associated with a service (e.g., provided by server 120) that enables user 510 to create and/or select signs to be displayed by configurable sign 130. User 510 (e.g., via user device 110) may access the service (e.g., via a password and/or account information) provided by server 120, and may provide sign configuration inputs 520 and/or sign information 530 to server 120. Sign configuration inputs 520 may include user 510 selection of a sign (e.g., a sign stored in a database associated with server 120), user 510 creation of a custom sign (e.g., rather than selecting a sign), etc. Sign information 530 may include textual information, graphical information, video information, audio information, etc. to be included in the selected/created sign.

Server 120 may receive a variety of information from other sources, as shown in FIG. 5A. For example, server 120 may receive advertisement (ad) information 540 for configurable sign 130 from one or more providers of a product and/or service. Advertisement information 540 may include one or more advertisements associated with products and/or services provided by the product and/or service provider. Server 120 may receive pre-created signs 550 from a producer of signs (e.g., similar to a producer of bumper stickers). Pre-created signs 130 may include signs that may be displayed by configurable sign 130. In another implementation, an owner and/or manager of server 120 may create pre-created signs 550. Server 120 may receive friend signs 560 from friends of user 510. Friend signs 560 may include signs, created by user's 510 friends, which may be displayed by configurable sign 130. User 510 may permit his/her friends to utilize signs created and/or owned by user 510. Likewise, user's 510 friends may permit user 510 to utilize signs created and/or owned by user's 510 friends. Such an arrangement may create a social network for configurable sign 130, where owners of configurable signs 130 may share signs for display on configurable signs 130.

As further shown in FIG. 5A, server 120 may receive emergency information 570 from state or federal agencies (e.g., in the event of a state or national emergency) or from a manufacturer of vehicle 140. Emergency information 570 may include information advising travelers of emergencies (e.g., hurricanes, tornados, flooding, etc.), information providing emergency instructions (e.g., evacuation information), etc., which may be received from state or federal agencies. Emergency information 570 may also include warnings associated with operation of vehicle 140 and/or vehicle passengers (e.g., excessive internal vehicle temperature warnings, excessive internal vehicle carbon dioxide or carbon monoxide warnings, etc.), which may be received from a manufacturer of vehicle 140. Server 120 may receive traffic information 580 from state or local agencies (e.g., in the event of traffic problems). Traffic information 580 may include traffic accident information, traffic congestion information, lane closing information, road construction information, etc. Server 120 may store sign information 530 and/or the information received from the other sources in a repository (e.g., main memory 330, ROM 340, and/or main memory 350) associated with server 120, and may utilize such information to create configured sign information 590 that may be displayed by configurable sign 130.

Configured sign information 590 may include information capable of being displayed by configurable sign 130. For example, in one implementation, configured sign information 590 may include textual information 450, graphical information 460, video information 470, audio information 480, as described above in connection with, for example, FIG. 4. In other implementations, configured sign information 590 may include one or more of sign information 530, advertisement information 540, pre-created signs 550, friend signs 560, emergency information 570, and/or traffic information 580. Server 120 may provide configured sign information 590 to configurable sign 130, and configurable sign 130 may receive and provide configured sign information 590 (e.g., via display 410 and/or speaker 420).

In one exemplary implementation, configurable sign 130 may receive configured sign information 590, may configure text, graphics, and/or video (e.g., associated with display 410) based on configured sign information 590. In one example, configurable sign 130 may extract textual, graphical, and/or video information from configured sign information 590, may convert the textual, graphical, and/or video information to formats capable of being displayed by display 410, and may provide the converted textual, graphical, and/or video information to display 410. Configurable sign 130 may display (e.g., via display 410) the configured text, graphics, and/or video. Configurable sign 130 may also configure audio (e.g., associated with speaker 420) based on configured sign information 590. In one example, configurable sign 130 may extract audio information from configured sign information 590, may convert the audio information to a format capable of being generated by speaker 420, and may provide the converted audio information to speaker 420. Configurable sign 130 may generate (e.g., via speaker 420) the configured audio.

In another exemplary implementation, configured sign information 590 may include a time parameter that provides a time(s) of day when configured sign information 590 may be displayed by configurable sign 130. For example, if configured sign information 590 indicates that configured sign information 590 should be displayed at 4:00 PM and is provided at 2:00 PM to configurable sign 130, configurable sign 130 may wait two hours before displaying configured sign information 590.

Although FIG. 5A shows exemplary components of network portion 500, in other implementations, network portion 500 may contain fewer, different, differently arranged, or additional components than depicted in FIG. 5A. In still other implementations, one or more components of network portion 500 may perform one or more other tasks described as being performed by one or more other components of network portion 500. For example, in one exemplary implementation, server 120 may be omitted and user device 110 may perform the functions described as being performed by server 120.

FIG. 5B illustrates a diagram of an exemplary configurable sign 130 capable of being produced by the operations depicted in FIG. 5A. As shown in FIG. 5B, configurable sign 130 may include housing 400 and display 410. Housing 400 and display 410 may include the features described above in connection with, for example, FIG. 4. As further shown in FIG. 5B, display 410 may provide textual information 450, graphical information 460, and/or video information 470.

Textual information 450 may include textual information created and/or selected by user 510 (e.g., as provided by sign configuration inputs 520 and/or sign information 530). For example, textual information 450 may include a personal message from user 510 (e.g., "Have a nice day!"). Graphical information 460 may include graphical information created and/or selected by user 510 (e.g., as provided by sign configuration inputs 520 and/or sign information 530). For example, graphical information 460 may include a picture (e.g., a smiley face) that may or may not be associated with textual information 450. Video information 470 may include video information created and/or selected by user 510 (e.g., as provided by sign configuration inputs 520 and/or sign information 530). For example, video information 470 may include a movie, a video, a commercial, and advertisement, etc. that may or may not be associated with textual information 450.

Although FIG. 5B shows exemplary information capable of being provided by configurable sign 130, in other implementations, configurable sign 130 may contain less, different, differently arranged, or additional information than depicted in FIG. 5B.

FIG. 6A depicts a diagram of exemplary sign configuration operations capable of being performed by an exemplary portion 600 of network 100. As illustrated, exemplary network portion 600 may include server 120, multiple configurable signs 130, and multiple vehicles 140. Server 120, configurable signs 130, and vehicles 140 may include the features described above in connection with, for example, FIGS. 1-4.

As further shown in FIG. 6A, a user 610 may be associated with server 120. In one implementation, user 610 may include an employee or an owner of a product and/or service provider that is associated with (or owns) configurable signs 130 and/or vehicles 140. For example, user 610 may be associated with a company that owns configurable signs 130 and/or vehicles 140 and wishes to convey messages associated with the company (e.g., a promotion for a product and/or service offered by the company). User 610 may access server 120 (e.g., via a password and/or account information), and may provide sign configuration inputs 620 and/or sign information 630 to server 120. Sign configuration inputs 620 may include user 610 selection of a sign (e.g., a sign stored in a database associated with server 120), user 610 creation of a custom sign (e.g., rather than selecting a sign), etc. In one exemplary implementation, sign configuration inputs 620 may include a geographical parameter (e.g., that instructs server 120 to provide sign configuration information to configurable signs 130 located at certain geographical locations) and/or a time parameter (e.g., that instructs server 120 to provide sign configuration information to configurable signs 130 at certain times). Sign information 630 may include textual information, graphical information, video information, audio information, etc. to be included in the selected/created sign. For example, in one implementation, user 610 may provide sign configuration inputs 620 and/or sign information 630 associated with a current promotion being offered by the product and/or service provider.

Server 120 may create configured sign information 640 based on sign configuration inputs 620 and/or sign information 630. Configured sign information 640 may include information capable of being displayed by configurable signs 130. For example, in one implementation, configured sign information 640 may include textual information 450, graphical information 460, video information 470, audio information 480, as described above in connection with, for example, FIG. 4. In other implementations, configured sign information 640 may include sign information 630 and may be different for each of configurable signs 130 depicted in FIG. 6A. Server 120 may provide configured sign information 640 to configurable signs 130 affixed to multiple vehicles 140 (e.g., cars, trucks, vans, etc. associated with the product and/or service provider). Each of configurable signs 130 may receive configured sign information 640, and may display configured sign information 640 (e.g., via display 410).

In one example, configured sign information 640 may include information for displaying a sign providing the current promotion offered by the product and/or service provider. The arrangement depicted in FIG. 6A may enable the product and/or service provider to display the same promotion on vehicles 140 owned by (or associated with) the provider. In one exemplary implementation, server 120 may customize configured sign information 640 based on geographical information, time information, etc. associated with vehicles 140. In such a scenario, server 120 may provide certain customized sign information 640 to certain configurable signs 130 (e.g., configurable signs 130 affixed to vehicles 140 in a certain geographical area and/or at a certain time of day), and may provide other customized sign information 640 to other configurable signs 130 (e.g., configurable signs 130 affixed to vehicles 140 in another geographical area and/or at another time of day).

Although FIG. 6A shows exemplary components of network portion 600, in other implementations, network portion 600 may contain fewer, different, differently arranged, or additional components than depicted in FIG. 6A. In still other implementations, one or more components of network portion 600 may perform one or more other tasks described as being performed by one or more other components of network portion 600. For example, in one exemplary implementation, server 120 may be omitted and user device 110 may perform the functions described as being performed by server 120.

Figure 6B:
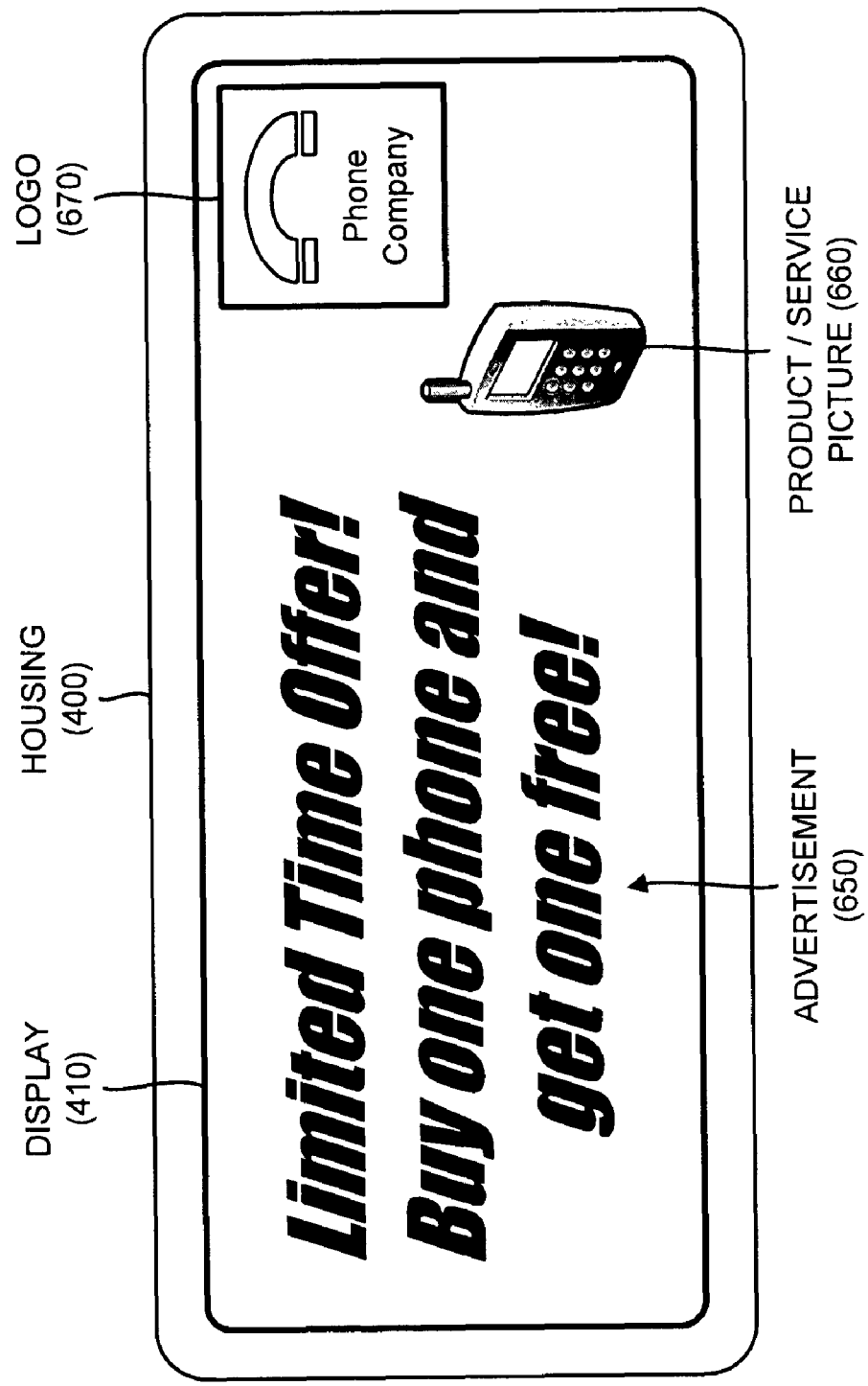
FIG. 6B illustrates a diagram of an exemplary configurable vehicular sign capable of being produced by the operations depicted in FIG. 6A.

FIG. 6B illustrates a diagram of an exemplary configurable sign 130 capable of being produced by the operations depicted in FIG. 6A. As shown in FIG. 6B, configurable sign 130 may include housing 400 and display 410. Housing 400 and display 410 may include the features described above in connection with, for example, FIG. 4. As further shown in FIG. 6B, display 410 may provide an advertisement 650, a product and/or service picture 660, and a logo 670.

Advertisement 650 may include advertisement information (e.g., advertisement information 540) provided as textual information 450, graphical information 460, and/or video information 460. For example, as shown in FIG. 6B, advertisement 650 may include textual information (e.g., "Limited Time Offer! But one phone and get one free!") associated with a promotion provided by a product and/or service provider.

Product/service picture 660 may include information associated with the product and/or service described by advertisement 650. For example, as shown in FIG. 6B, product/service picture 660 may include graphical information (e.g., a picture of a cell phone) associated with the promotion described by advertisement 650.

Logo 670 may include information associated with the product and/or service provider displaying advertisement 650 and/or product/service picture 660. For example, as shown in FIG. 6B, logo may include graphical information (e.g., a logo of a phone company) associated with the product and/or service provider.

Although FIG. 6B shows exemplary information capable of being provided by configurable sign 130, in other implementations, configurable sign 130 may contain less, different, differently arranged, or additional information than depicted in FIG. 6B.

FIG. 7A depicts a diagram of an exemplary configurable sign 130 showing emergency information. As shown in FIG. 7A, configurable sign 130 may include housing 400 and display 410. Housing 400 and display 410 may include the features described above in connection with, for example, FIG. 4. In one exemplary implementation, if configurable sign 130 depicted in FIG. 7A is affixed to an interior portion of vehicle 140 and includes carbon dioxide and/or carbon monoxide detectors, configurable sign 130 may provide the information depicted in FIG. 7A if a preset threshold (e.g., a threshold where carbon dioxide and/or carbon monoxide may be harmful to humans and pets) is exceeded. As shown, configurable sign 130 may depict a warning 700 via display 410 and/or may provide an audio alarm 710 via speaker 420.

Warning 700 may include emergency information (e.g., emergency information 570) provided as textual information 450, graphical information 460, and/or video information 460. For example, as shown in FIG. 7A, warning 700 may include textual information (e.g., "WARNING! Carbon dioxide/carbon monoxide levels high!") that provides a warning regarding carbon dioxide and/or carbon monoxide levels in vehicle 140.

Audio alarm 710 may include audio information (e.g., audio information 480) associated with warning 700. For example, audio alarm 710 may include an audible alarm (e.g., a beeping sound similar to a smoke detector alarm), an alarm reciting the text provided in warning 710 (e.g., an alarm stating "WARNING! Carbon dioxide/carbon monoxide levels high!"), etc.

FIG. 7B depicts a diagram of an exemplary configurable sign 130 showing emergency information. As shown in FIG. 7B, configurable sign 130 may include housing 400 and display 410. Housing 400 and display 410 may include the features described above in connection with, for example, FIG. 4. In one exemplary implementation, if configurable sign 130 depicted in FIG. 7B is affixed to an interior portion of vehicle 140 and includes a temperature sensor, configurable sign 130 may provide the information depicted in FIG. 7B if a preset threshold (e.g., a threshold where an interior vehicle temperature may be harmful to humans and pets) is exceeded. As shown, configurable sign 130 may depict a warning 720 via display 410 and/or may provide an audio alarm 730 via speaker 420.

Warning 720 may include emergency information (e.g., emergency information 570) provided as textual information 450, graphical information 460, and/or video information 460. For example, as shown in FIG. 7B, warning 720 may include textual information (e.g., "WARNING! Temperature in vehicle at dangerous levels!") that provides a warning regarding the temperature of the interior of vehicle 140.

Audio alarm 730 may include audio information (e.g., audio information 480) associated with warning 720. For example, audio alarm 730 may include an audible alarm (e.g., a beeping sound similar to a smoke detector alarm), an alarm reciting the text provided in warning 710 (e.g., an alarm stating "WARNING! Temperature in vehicle at dangerous levels!"), etc. In one implementation, audio alarm 730 may be loud enough to be heard outside of vehicle 140 (e.g., in a situation where a child (or pet) is left unattended in vehicle 140). However, in such a situation, configurable sign 130 may be equipped with an additional sensor (e.g., a motion detector) capable of detecting the presence of the child (or pet) left unattended in vehicle 140.

Although FIGS. 7A and 7B show exemplary information capable of being provided by configurable sign 130, in other implementations, configurable sign 130 may contain less, different, differently arranged, or additional information than depicted in FIGS. 7A and 7B. For example, configurable sign 130 may provide information associated with other emergencies (e.g., a hurricane, a tornado, etc.) and instructions (e.g., evacuation routes) associated with the other emergencies. In another example, if vehicle 140 were being carjacked, stolen, or being used by an unauthorized teenage family member, a trigger or a remote signal may be sent to configurable sign 130 that displays "Unauthorized Use—Call Authorities."

FIG. 8A illustrates a diagram of exemplary sign configuration operations capable of being performed by an exemplary portion 800 of network 100. As illustrated, exemplary network portion 800 may include user device 110, server 120, configurable sign 130, and vehicle 140. User device 110, server 120, configurable sign 130, and vehicle 140 may include the features described above in connection with, for example, FIGS. 1-4.

As further shown in FIG. 8A, a user 810 may be associated with user device 110. In one implementation, user 810 may include an owner of user device 110, configurable sign 130, and/or vehicle 140. In other implementations, user 810 may be associated with user device 110, configurable sign 130, and/or vehicle 140, but may not be the owner of user device 110, configurable sign 130, and/or vehicle 140. In one example, user 810 may be associated with a service (e.g., provided by server 120) that enables user 810 to pay a monthly fee for parking vehicle 140. User 810 (e.g., via user device 110) may access the service (e.g., via a password and/or account information) provided by server 120, and may pay a monthly parking fee, as indicated by reference number 820, to server 120. For example, user 810 may pay for the monthly parking via a credit card, a debit card, an electronic funds transfer, and/or other electronic payment mechanisms.

Server 120 may receive payment of the monthly parking fee from user device 110, and may utilize such information to create configured sign information 830 that may be displayed by configurable sign 130. Configured sign information 830 may include information capable of being displayed by configurable sign 130. For example, in one implementation, configured sign information 830 may include textual information 450, graphical information 460, video information 470, audio information 480, as described above in connection with, for example, FIG. 4. Server 120 may provide configured sign information 830 to configurable sign 130, and configurable sign 130 may receive and display configured sign information 830 (e.g., via display 410). In one exemplary implementation, configured sign information 830 may include a time parameter that may cause configurable display 130 to display configured sign information 830 for a predetermined period of time (e.g., until the next month's parking fee is paid in full).

Although FIG. 8A shows exemplary components of network portion 800, in other implementations, network portion 800 may contain fewer, different, differently arranged, or additional components than depicted in FIG. 8A. In still other implementations, one or more components of network portion 800 may perform one or more other tasks described as being performed by one or more other components of network portion 800.

FIG. 8B illustrates a diagram of an exemplary configurable sign 130 capable of being produced by the operations depicted in FIG. 8A. As shown in FIG. 8B, configurable sign 130 may include housing 400 and display 410. Housing 400 and display 410 may include the features described above in connection with, for example, FIG. 4. As further shown in FIG. 8B, display 410 may provide confirmation information 840 and advertisement 850.

Confirmation information 840 may include monthly parking information provided as textual information 450, graphical information 460, and/or video information 460. For example, as shown in FIG. 8B, confirmation information 840 may include textual information (e.g., "Monthly parking paid in full.") that provides an indication of whether user 810 and/or vehicle 140 associated with configurable sign 130 has paid for monthly parking. Confirmation information 840 may enable a parking attendant to determine whether vehicle 140 may permitted at a parking facility.

Advertisement 850 may include advertisement information (e.g., advertisement information 540) provided as textual information 450, graphical information 460, and/or video information 460. For example, as shown in FIG. 8B, advertisement 850 may include textual information (e.g., "SHOP AT SHOPPER MART TODAY! 123 North Broad St., Big City, State 9999") associated with a product and/or service provider. The product and/or service provider associated with advertisement 850 may provide a fee to the parking facility owner in order to display advertisement on configurable sign 130. Alternatively and/or additionally, the product and/or service provider associated with advertisement 850 may provide a fee to user 810 in order to display advertisement on configurable sign 130. Such an arrangement may provide a source of revenue for the parking facility owner and/or user 810.

Although FIG. 8B shows exemplary information capable of being provided by configurable sign 130, in other implementations, configurable sign 130 may contain less, different, differently arranged, or additional information than depicted in FIG. 8B. For example, configurable sign 130 may provide a HOV permit, a toll collection permit (e.g., an E-ZPass permit), a high occupancy toll (HOT) lane permit, etc.

Figure 9:
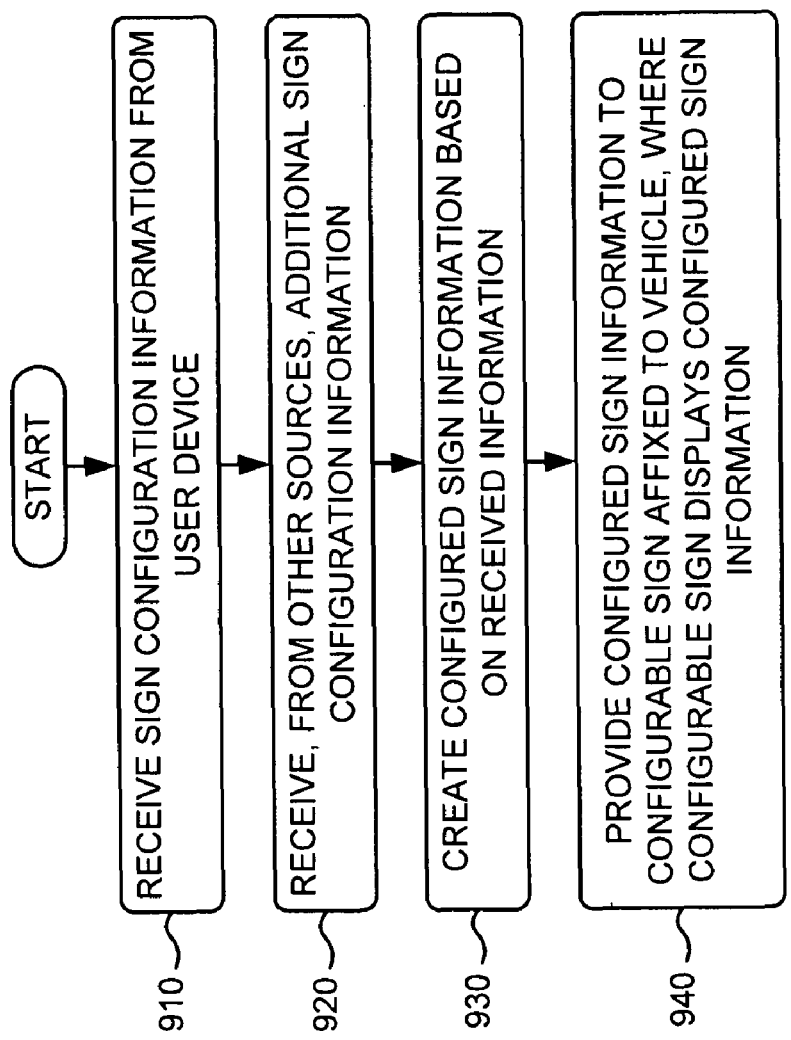
FIGS. 9-11 illustrate flow charts of an exemplary process for configuring a remotely configurable vehicular sign for personal applications according to implementations described herein.
Figure 10:
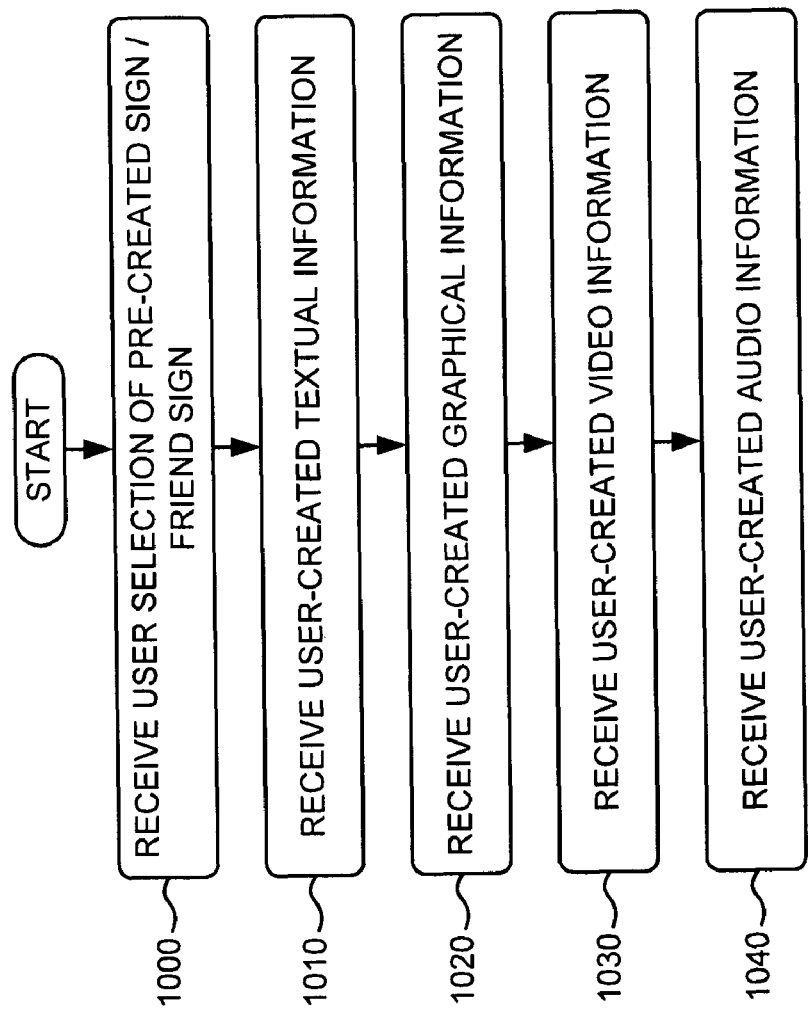
Figure 11:
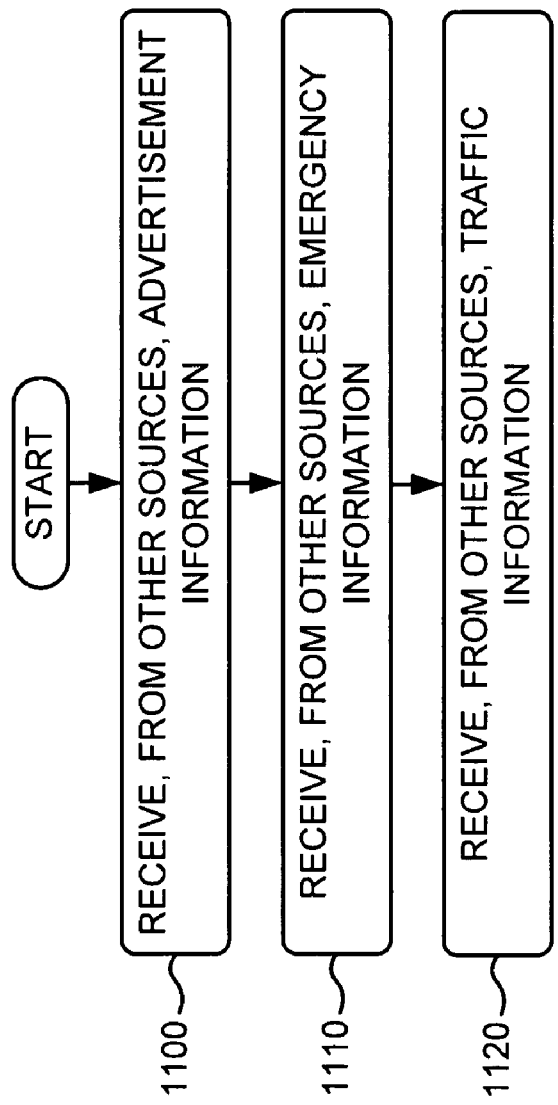

FIGS. 9-11 depict flow charts of an exemplary process 900 for configuring a remotely configurable vehicular sign for personal applications according to implementations described herein. In one implementation, process 900 may be performed by server 120. In another implementation, some or all of process 900 may be performed by another device (e.g., user device 110) or group of devices, including or excluding server 120.

As illustrated in FIG. 9, process 900 may begin with receipt of sign configuration information from a user device (block 910), and receipt, from other sources, additional sign configuration information (block 920). For example, in implementations described above in connection with FIG. 5A, user 510 (e.g., via user device 110) may provide sign configuration inputs 520 and/or sign information 530 to server 120. Sign configuration inputs 520 may include user 510 selection of a sign, user 510 creation of a custom sign, etc. Sign information 530 may include textual information, graphical information, video information, audio information, etc. to be included in the selected/created sign. Server 120 may receive advertisement (ad) information 540 for configurable sign 130 from one or more providers of a product and/or service, may receive pre-created signs 550 from a producer of signs (e.g., similar to a producer of bumper stickers), and may receive friend signs 560 from friends of user 510. Server 120 may receive emergency information 570 from state or federal agencies (e.g., in the event of a state or national emergency) or from a manufacturer of vehicle 140, and may receive traffic information 580 from state or local agencies (e.g., in the event of traffic problems).

As further shown in FIG. 9, configured sign information may be created based on the received information (block 930), and the configured sign information may be provided to a configurable sign affixed to a vehicle, where the configurable sign displays the configured sign information (block 940). For example, in implementations described above in connection with FIG. 5A, server 120 may utilize one or more of sign information 530, advertisement information 540, pre-created signs 550, friend signs 560, emergency information 570, traffic information 580 to create configured sign information 590 that may be displayed by configurable sign 130. Configured sign information 590 may include information capable of being displayed by configurable sign 130. Server 120 may provide configured sign information 590 to configurable sign 130, and configurable sign 130 may receive and provide configured sign information 590 (e.g., via display 410 and/or speaker 420).

Process block 910 may include the process blocks illustrated in FIG. 10. As shown in FIG. 10, process block 910 may include one or more of receiving user selection of a pre-created sign and/or a friend sign (block 1000), receiving user-created textual information (block 1010), receiving user-created graphical information (block 1020), receiving user-created video information (block 1030), and/or receiving user-created audio information (block 1040). For example, in implementations described above in connection with FIG. 5A, user 510 (e.g., via user device 110) may provide sign configuration inputs 520 and/or sign information 530 to server 120. Sign configuration inputs 520 may include user 510 selection of a sign (e.g., one of pre-created signs, one of friend signs, etc.), user 510 creation of a custom sign (e.g., rather than selecting a sign), etc. Sign information 530 may include textual information, graphical information, video information, audio information, etc. to be included in the selected/created sign.

Process block 920 may include the process blocks illustrated in FIG. 11. As shown in FIG. 11, process block 920 may include one or more of receiving, from other sources, advertisement information (block 1100), receiving, from other sources, emergency information (block 1110), and/or receiving, from other sources, traffic information (block 1120). For example, in implementations described above in connection with FIG. 5A, server 120 may receive advertisement (ad) information 540 for configurable sign 130 from one or more providers of a product and/or service. Advertisement information 540 may include one or more advertisements associated with products and/or services provided by the product and/or service provider. Server 120 may receive emergency information 570 from state or federal agencies (e.g., in the event of a state or national emergency) or from a manufacturer of vehicle 140. Emergency information 570 may include information advising travelers of emergencies (e.g., hurricanes, tornados, flooding, etc.), information providing emergency instructions (e.g., evacuation information), etc. Emergency information 570 may also include warnings associated with operation of vehicle 140 and/or vehicle passengers (e.g., excessive internal vehicle temperature warnings, excessive internal vehicle carbon dioxide or carbon monoxide warnings, etc.). Server 120 may receive traffic information 580 from state or local agencies (e.g., in the event of traffic problems). Traffic information 580 may include traffic accident information, traffic congestion information, lane closing information, road construction information, etc.

Figure 12:
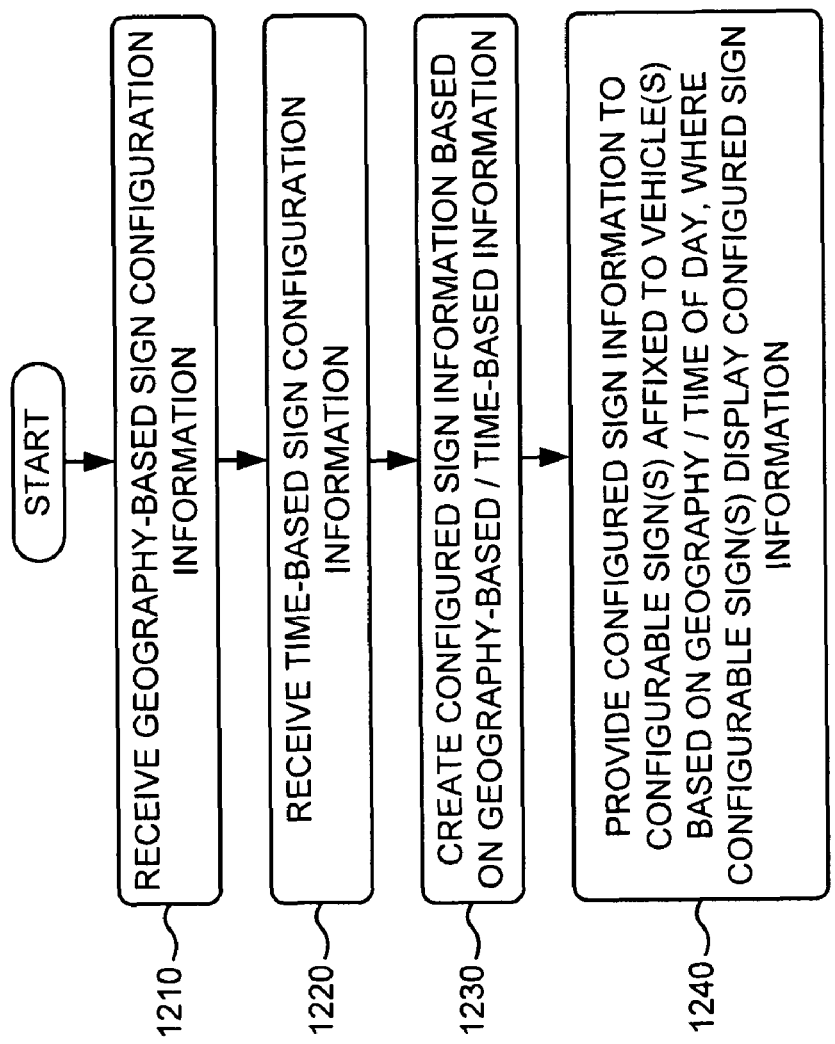
FIG. 12 depicts a flow chart of an exemplary process for configuring a remotely configurable vehicular sign for commercial applications according to implementations described herein.

FIG. 12 illustrates a flow chart of an exemplary process 1200 for configuring a remotely configurable vehicular sign for commercial applications according to implementations described herein. In one implementation, process 1200 may be performed by server 120. In another implementation, some or all of process 1200 may be performed by another device (e.g., user device 110) or group of devices, including or excluding server 120.

As illustrated in FIG. 12, process 1200 may begin with receipt of geography-based sign configuration information (block 1210), and receipt of time-based sign configuration information (block 1220). For example, in implementations described above in connection with FIG. 6A, user 610 may provide sign configuration inputs 620 and/or sign information 630 to server 120. In one example, sign configuration inputs 620 may include a geographical parameter (e.g., that instructs server 120 to provide sign configuration information to configurable signs 130 located at certain geographical locations) and/or a time parameter (e.g., that instructs server 120 to provide sign configuration information to configurable signs 130 at certain times). Sign information 630 may include textual information, graphical information, video information, audio information, etc. to be included in the selected/created sign.

As further shown in FIG. 12, configured sign information may be created based on the geography-based and/or time-based configuration information (block 1230), and the configured sign information may be provided to one or more configurable signs affixed to one or more vehicles, where the configurable sign(s) display the configured sign information (block 1240). For example, in implementations described above in connection with FIG. 6A, server 120 may create configured sign information 640 based on sign configuration inputs 620 and/or sign information 630. Configured sign information 640 may include information capable of being displayed by configurable signs 130. Server 120 may provide configured sign information 640 to configurable signs 130 affixed to multiple vehicles 140 (e.g., cars, trucks, vans, etc. associated with the product and/or service provider). Each of configurable signs 130 may receive configured sign information 640, and may display configured sign information 640 (e.g., via display 410). In one example, server 120 may customize configured sign information 640 based on geographical information, time information, etc. associated with vehicles 140. In such a scenario, server 120 may provide certain customized sign information 640 to certain configurable signs 130 (e.g., configurable signs 130 affixed to vehicles 140 in a certain geographical area and/or at a certain time of day), and may provide other customized sign information 640 to other configurable signs 130 (e.g., configurable signs 130 affixed to vehicles 140 in another geographical area and/or at another time of day).

FIG. 13 depicts a flow chart of an exemplary process 1300 for configuring and displaying information via a configurable vehicular sign according to implementations described herein. In one implementation, process 1300 may be performed by configurable sign 130. In another implementation, some or all of process 1300 may be performed by another device (e.g., user device 110 and/or server 120) or group of devices, including or excluding configurable sign 130.

As illustrated in FIG. 13, process 1300 may begin with receiving, with a configurable sign affixed to a vehicle, configured sign information from a user device and/or a server (block 1310), configuring text, graphics, and/or video, associated with a display of the configurable sign, based on the configured sign information (block 1320), and displaying, via the display, the configured text, graphics, and/or video (block 1330). For example, in implementations described above in connection with FIG. 5A, server 120 may provide configured sign information 590 to configurable sign 130, and configurable sign 130 may receive configured sign information 590. Configurable sign 130 may receive configured sign information 590, may configure text, graphics, and/or video, (e.g., associated with display 410) based on configured sign information 590. In one example, configurable sign 130 may extract textual, graphical, and/or video information from configured sign information 590, may convert the textual, graphical, and/or video information to formats capable of being displayed by display 410, and may provide the converted textual, graphical, and/or video information to display 410. Configurable sign 130 may display (e.g., via display 410) the configured text, graphics, and/or video.

As further shown in FIG. 13, audio, associated with a speaker of the configurable sign, may be configured based on the configured sign information (block 1340), and the configured audio may be provided via the speaker (block 1350). For example, in implementations described above in connection with FIG. 5A, configurable sign 130 may configure audio (e.g., associated with speaker 420) based on configured sign information 590. In one example, configurable sign 130 may extract audio information from configured sign information 590, may convert the audio information to a format capable of being generated by speaker 420, and may provide the converted audio information to speaker 420. Configurable sign 130 may generate (e.g., via speaker 420) the configured audio.

Systems and/or methods described herein may remotely configure a sign affixed to a vehicle in order to customize the sign to a particular user, application, event, etc. In one implementation, for example, the systems and/or methods may receive sign configuration information from a user device, and may receive, from other sources, additional information associated with a configurable sign. The systems and/or methods may create configured sign information based on the received information, and may provide the configured sign information to the configurable sign affixed to a vehicle, where the configurable sign may display the configured sign information.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-13, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A computing device-implemented method, comprising:
    receiving sign configuration information from a user device;
    receiving, from other sources, additional sign configuration information;
    creating configured sign information based on the sign configuration information and the additional sign configuration information;
    providing the configured sign information to a sign affixed to a vehicle, where the sign displays the configured sign information; and
    where the sign configuration information comprises audio information, and the method further comprises:
    creating the configured sign information based on the audio information; and
    providing the configured sign information based on the audio information to a speaker associated with the sign, where the speaker generates the audio information.

2. The computing device-implemented method of claim 1, where the sign configuration information comprises at least one of:
    textual information,
    graphical information, or
    video information.

3. The computing device-implemented method of claim 1, where the configured sign, information, comprises at least one of:
    textual information,
    graphical information, or
    video information.

4. The computing device-implemented method of claim 1, where receiving sign configuration information comprises at least one of:
    receiving selection of a pre-created sign from the user device; or
    receiving selection of a sign associated with a friend of a user of the user device.

5. The computing device-implemented method of claim 1, where receiving sign configuration information comprises at least one of:
    receiving textual information created by the user device;
    receiving graphical information created by the user device;
    receiving video information created by the user device; or
    receiving audio information created by the user device.

6. The computing-device implemented method of claim 1, where receiving, from other sources, additional sign configuration information comprises at least one of:
    receiving, from the other sources, advertisement information;
    receiving, from the other sources, emergency information; or
    receiving, from the other sources, traffic information.

7. The computing device-implemented method of claim 1, where the user device comprises one or more of:
    a radiotelephone, a personal communications system (PCS) terminal,
a personal digital assistant (PDA),
a personal computer, or
a laptop computer.

8. The computing, device-implemented method of claim 1, where the computing device comprises a server.

9. A computing device-implemented method, comprising:
receiving sign configuration information;
receiving geography-based sign configuration information; and
creating a first set of sign configuration information and a second set of sign configuration information based on the sign configuration information and the geography-based sign configuration information, where the first set of sign configuration information is affixed to one or more first vehicles and the second set of sign configuration information is affixed to one or more second vehicles.

10. The computing device-implemented method of claim 9, where receiving sign configuration information comprises:
receiving time-based sign configuration information.

11. The computing device-implemented method of claim 10, where:
the received time-based sign configuration information is also used to create the first set of sign configuration information and the second set of sign configuration information.

12. A configurable sign, comprising:
a mechanism that connects the configurable sign to a vehicle;
a display;
a memory to store a plurality of instructions;
a processor to execute instructions in the memory to:
receive configured sign information from one of a user device or a server,
receive additional sign configuration information from one or more other sources;
configure at least one of text, graphics, or video, associated with the display, based on the configured sign information and the additional sign configuration information, and
display, via the display, the configured text, graphics, or video; and
a speaker;
where the processor further executes instructions in the memory to configure audio, associated with the speaker, based on the configured sign information, and provide, via the speaker, the configured audio.

13. The configurable sign of claim 12, where the mechanism comprises at least one of:
a mechanism that connects the configurable sign to an interior portion of the vehicle,
a mechanism that connects the configurable sign to an exterior portion of the vehicle, or
an anti-theft device that disables the configurable sign when the configurable sign is removed from the vehicle.

14. The configurable sign of claim 12, further comprising:
an interface that enables the configurable sign to connect, via a wired connection, to the user device.

15. The configurable sign of claim 12, where the display comprises at least one of:
a transmissive electronic display,
a transflective electronic display,
a reflective electronic display, or
an electro-mechanical display.

16. The configurable sign of claim 12, where the processor further executes instructions in the memory to:

receive one of advertisement information, emergency information, or traffic information from one of the user device or the server, and
display, via the display, one of the advertisement information, the emergency information, or the traffic information.

17. A method implemented by a configurable vehicular sign, the method comprising:
receiving configured sign information from one of a user device or a server that is remotely located from the configurable vehicular sign, said user device or said server receiving geography-based sign configuration information upon which said configured sign information is based;
displaying, via a display associated with the configurable vehicular sign, at least one of textual information, graphical information, or video information associated with the configured sign information; and
generating, via a speaker associated with the configurable vehicular sign, audio information associated with the configured sign information.

18. The method of claim 17, further comprising:
receiving one of advertisement information, emergency information, or traffic information from one of the user device or the server; and
display, via the display, one of the advertisement information, the emergency information, or the traffic information.

19. The method of claim 17, where the configured sign information includes a time parameter that indicates a time when the configurable vehicular sign is to display at least one of the textual information, the graphical information, or the video information associated with the configured sign information.

20. The method of claim 17, where the configured sign information comprises at least one of
a pre-created sign selected by the user device, or
a sign associated with a friend of a user of the user device.

21. The method of claim 17, further comprising:
configuring one of text, graphics, or video, associated with the display, based on the configured sign information; and
displaying, via the display, the configured text, graphics, or video.

22. A configurable sign, comprising:
a mechanism that connects the configurable sign to a vehicle;
a display;
a memory to store a plurality of instructions;
a processor to execute instructions in the memory to:
receive configured sign information from one of a user device or a server and receive additional sign configuration information from one or more other sources;
configure at least one of text, graphics, or video, associated with the display, based on the configured sign information and the additional sign configuration information; and
display, via the display, the configured text, graphics, or video;
said configurable sign further comprising at least one of:
a thermometer that senses an interior temperature of the vehicle and causes the configurable sign to generate an alarm when the interior temperature of the vehicle exceeds a temperature threshold;
a carbon dioxide detector that senses carbon dioxide levels within the vehicle and causes the configurable sign to generate an alarm when the carbon dioxide levels within the vehicle exceed a carbon dioxide threshold; or a carbon monoxide detector that senses carbon monoxide levels within the vehicle and causes the configurable sign to generate an alarm when the carbon monoxide levels within the vehicle exceed a carbon monoxide threshold.

\* \* \* \* \*